United States Patent
Wong

(10) Patent No.: US 6,657,205 B1
(45) Date of Patent: Dec. 2, 2003

(54) TURBINE-BOOSTED ULTRAVIOLET-RADIATION STERILIZING FLUID PROCESSOR

(75) Inventor: Tommy Chi-Kin Wong, Kowloon (HK)

(73) Assignee: Vast Light Ltd., Kowloon (HK)

( * ) Notice: Subject to any disclaimer, the term of this patent is extended or adjusted under 35 U.S.C. 154(b) by 0 days.

(21) Appl. No.: 10/237,063

(22) Filed: Sep. 9, 2002

(30) Foreign Application Priority Data

Jul. 17, 2002 (CN) .......................... 2125622 U

(51) Int. Cl.⁷ ................................ C02F 1/32
(52) U.S. Cl. ............. 250/438; 210/167; 210/172; 210/192; 250/436; 250/437; 250/438; 366/336; 422/186
(58) Field of Search .................. 210/167, 172, 210/192; 250/436, 437, 438; 366/336, 340; 422/186, 186.06

(56) References Cited

U.S. PATENT DOCUMENTS

| 1,175,948 A | 3/1916 | French |
| 1,822,006 A | 9/1931 | Bull et al. |
| 3,754,658 A | 8/1973 | Messing |
| 5,069,885 A | 12/1991 | Ritchie |
| 5,605,400 A | 2/1997 | Kojima |
| 5,675,153 A | 10/1997 | Snowball |
| 5,785,845 A | 7/1998 | Colaiano |
| 6,454,952 B1 * | 9/2002 | Thorpe .................. 210/748 |

FOREIGN PATENT DOCUMENTS

| JP | 57-75113 | 5/1982 |
| JP | 59-150589 | 8/1984 |

* cited by examiner

Primary Examiner—John R. Lee
Assistant Examiner—James J Leybourne
(74) Attorney, Agent, or Firm—Rabin & Berdo, P.C.

(57) ABSTRACT

A turbine-boosted ultraviolet-radiation sterilizing fluid processor, comprising a quartz sleeve installed inside a tube unit, inside the quartz sleeve being installed an ultraviolet-radiation lamp, at the upper and lower end of the tube unit being respectively a fluid inlet tube and a fluid outlet tube; the invention is characterized in that: at the top of the tube unit and at the lower part of the fluid inlet tube is installed a diversion mechanism to form a fluid pressurizing chamber. When the fluid flows through the fluid inlet tube, into the diversion mechanism for pressurizing, a whirlpool spinning at a high speed is created so that the fluid with sterilizing function is blended properly. The fluid spinning at high speed also flushes the wall of the quartz sleeve thus increases the sterilizing effects and reduces the frequency for maintenance.

7 Claims, 14 Drawing Sheets

TURBINE-BOOSTED ULTRAVIOLET-RADIATION STERILIZING FLUID PROCESSOR

BACKGROUND OF THE INVENTION (a) Field of the Invention

The present invention relates to a turbine-boosted, ultraviolet-radiation sterilizing fluid processor, particularly one comprising a diversion mechanism installed at the top of a diversion tube to process fluid, so the fluid flow forms a whirlpool spinning at a high speed to improve the sterilization effect.

(b) Description of the Prior Art

A regular ultraviolet-radiation lamp processor involves an ultraviolet-radiation lamp installed inside a quartz sleeve. The flow rate of the fluid through the tube unit depends on the total energy of the ultraviolet radiation emitted from the lamp. When a fluid flows through the tube unit, the germs, algae or other organisms absorb the ultraviolet-radiation energy until the sterilizing effect is fatal. In a prior art of the tube unit, there is only a tube through which fluid flows. The fluid flow directly passes the interior, no matter if the ultraviolet radiation is emitted from the inside or outside to perform the sterilizing effects. Due to the restriction of the fluid flow rate, the slow-flowing fluid inside the tube unit is not blended properly, resulting in inconsistent exposure time while the fluid is being processed. Thus the sterilization is unsatisfactory. Furthermore, when the fluid passes by the tube unit, the cross-sectional area of passage is larger than the cross-sectional area of the fluid inlet tube, so the flow is slowed, resulting in accumulation of dirt onto the wall of the quartz sleeve, which obstructs and reduces the penetration of the ultraviolet radiation, and directly reduces the total energy of ultraviolet radiation absorbed by the organisms in the fluid. If all or part of the organisms in the fluid can not absorb a sufficient amount of ultraviolet energy to reach the fatal dosage when the fluid passes through the tube unit, there will be a total failure of the sterilizing functions. The loss of this sterilization is a major detriment.

Effects of sterilization are dependent on whether the ultraviolet energy can be absorbed sufficiently to reach to the fatal dosage of each living organism in the fluid. The effectiveness is dependent on whether the fluid is properly stirred and the degree of penetration of ultraviolet radiation. Therefore, the three major factors effecting the ultraviolet sterilization are: "consistent radiating time", "the penetration of the ultraviolet radiation" and the "absorption of a fatal dosage".

In analyzing the prior art of ultraviolet-radiation lamp processors it is found that they are deficient in the factors above. The construction of the present invention is shown in FIGS. 13 and 14, wherein inside-a tubular casing (a) is a spiral diversion plate (b), on the upper and lower part of the tubular casing (a) is respectively a fluid inlet tube (a1) and a fluid outlet tube (a2), wherein fluid can flow into the fluid inlet tube (a1) and out of the fluid outlet tube (a2). Inside the tubular casing (a) is a hole through the center (a3) in which the ultraviolet lamp (c) is installed to achieve sterilizing objectives.

A common characteristic of other types of ultraviolet-radiation lamp processors disclosed in other patents, such as U.S. Pat. Nos. 5,069,885, 5,785,845, 5,675,153, 5,605,400, 1,175,948, 1,822,006 and 3,754,658, and Japanese Patent Nos. Zhao-59-150589 and Te-Kai-Zhao-57-75113, relates to a spiral conduction plate installed in a tube unit, so that fluid flow will rotate inside the tube unit, and the fluid will then be blended to achieve the consistent absorption of a fatal dosage.

However, in the above units the fluid flows through the spiral diversion plate (b) and spins around the ultraviolet-radiation lamp (c) but the line and speed of the fluid flow are restricted by the length of the conduction current plate, thus resulting in an insufficient blending of the fluid. In addition, the volume of flow and speed of the fluid flowing through each diversion channel are not consistent and the desired sterilizing effect will not be achieved.

Moreover, the spiral diversion plate (b) only provides guidance to lead the fluid to flow at a low speed, and the extraneous matter contained in the fluid will easily accumulate on the surface of the ultraviolet-radiation lamp (c) thus obstructing and reducing the penetration of ultraviolet radiation, and reducing the sterilizing effects of the ultraviolet-radiation lamp (c).

Additionally, the tubular casing (a) has a spiral diversion plate (b) that is quite sophisticated in its configuration, causing increased production costs and reduced market competitiveness.

SUMMARY OF THE INVENTION

The main objective of the present invention is to provide a turbine-boosted, ultraviolet-radiation sterilizing fluid processor by which the fluid flowing into the unit forms a whirlpool rotating at a high speed even if the flow rate of fluid is restricted, enabling sufficient blending of the processed fluid to achieve maximum sterilization effect.

In order to achieve the objective mentioned above and avoid the shortcomings of the prior art, the present invention includes a quartz sleeve installed inside an outer tube unit, inside which is installed an ultraviolet-radiation lamp. At the upper and lower end of the tube unit is respectively a fluid inlet tube and a fluid outlet tube. Near the top of the outer tube unit a diversion mechanism is installed below the fluid inlet tube. The top of the tube is then a pressured-fluid chamber with the diversion mechanism containing several parallel spiral blades on a ring unit. A diversion channel is formed between the spiral blades that are inclined at a specified angle. It should be noted that the fluid inlet hole is larger than the fluid outlet hole of the diversion channel.

The inclination angle of the spiral blade of the present invention ranges from 91 to 179 degrees.

The downward inclination angle of the tapered protrusion located at the lower part of the diversion mechanism of the present invention ranges from 1 to 89 degrees.

The upward inclination angle of the tapered depression located at the lower part of the diversion mechanism of the present invention ranges from 1 to 89 degrees.

The fluid inlet hole of the diversion mechanism of the present invention is located at the upper part of the diversion channel, while the fluid outlet hole is located at the lower part of the diversion channel.

The diversion mechanism of the present invention is a ring unit, having a fluid inlet hole located on an outside rim of the diversion channel, and a fluid outlet hole on an inside rim of the diversion channel.

The diversion mechanism of the present invention is a ring unit, having a fluid inlet hole located on an inside rim of the diversion channel, and a fluid outlet hole on an outside rim of the diversion channel.

By the present invention, a whirlpool spinning at a high speed is formed inside the tube unit no matter whether the flow rate of the fluid is low or high, so that the fluid for the sterilizing function can be blended properly, thus increasing its sterilizing effects. Also the effect of the fluid spinning at high speed against the wall of the quartz sleeve reduces the accumulation of dirt on the wall of the quartz sleeve, thus reducing the need for frequent maintenance.

BRIEF DESCRIPTION OF THE DRAWINGS

The accomplishment of the above-mentioned object of the present invention will become apparent from the following description and its accompanying drawings, which illustrate the embodiment of the present invention, and are as follows.

DETAILED DESCRIPTION OF THE PREFERRED EMBODIMENT

Figure 1:
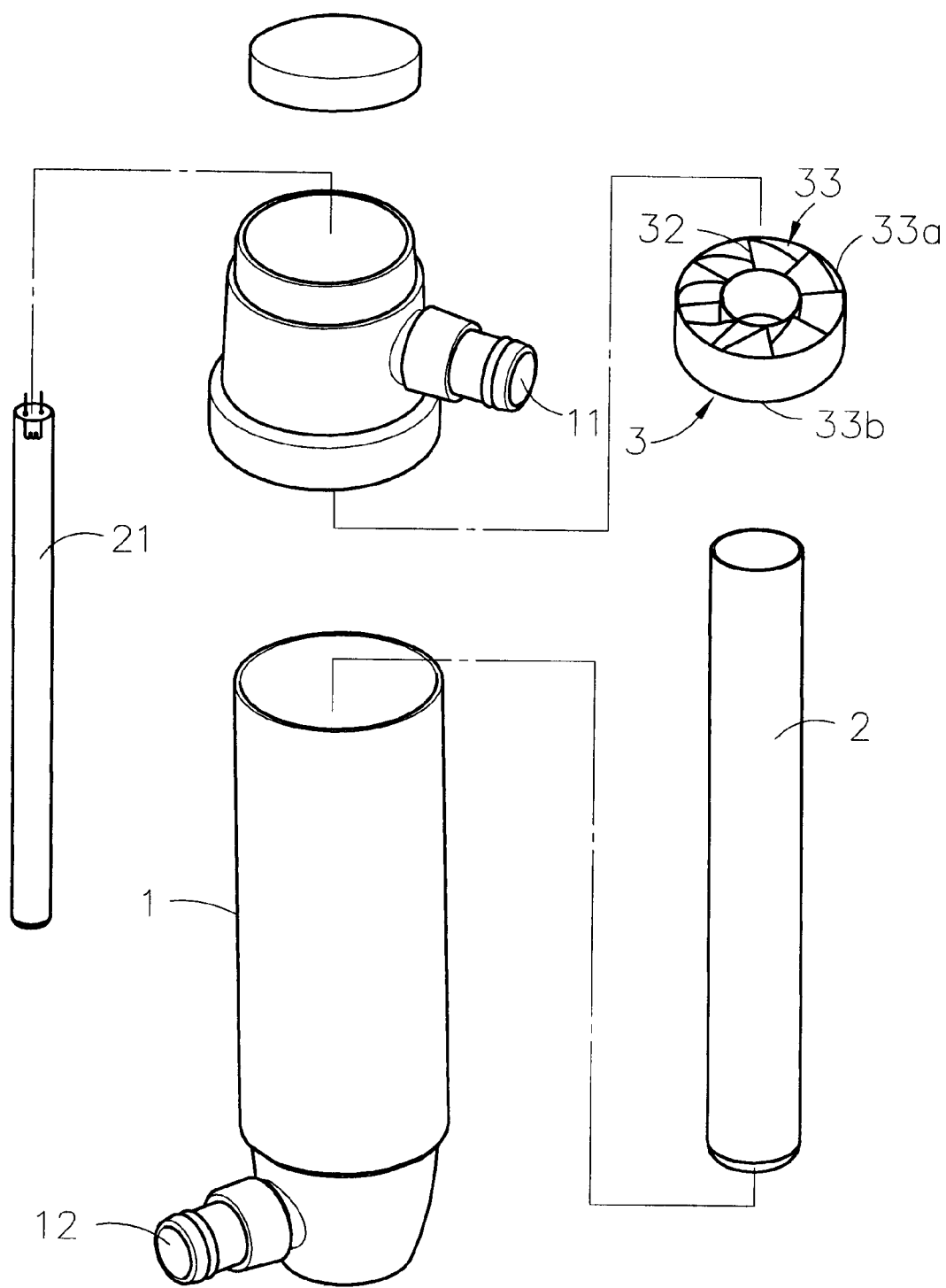
FIG. 1 is an exploded view of the invention.
Figure 2:
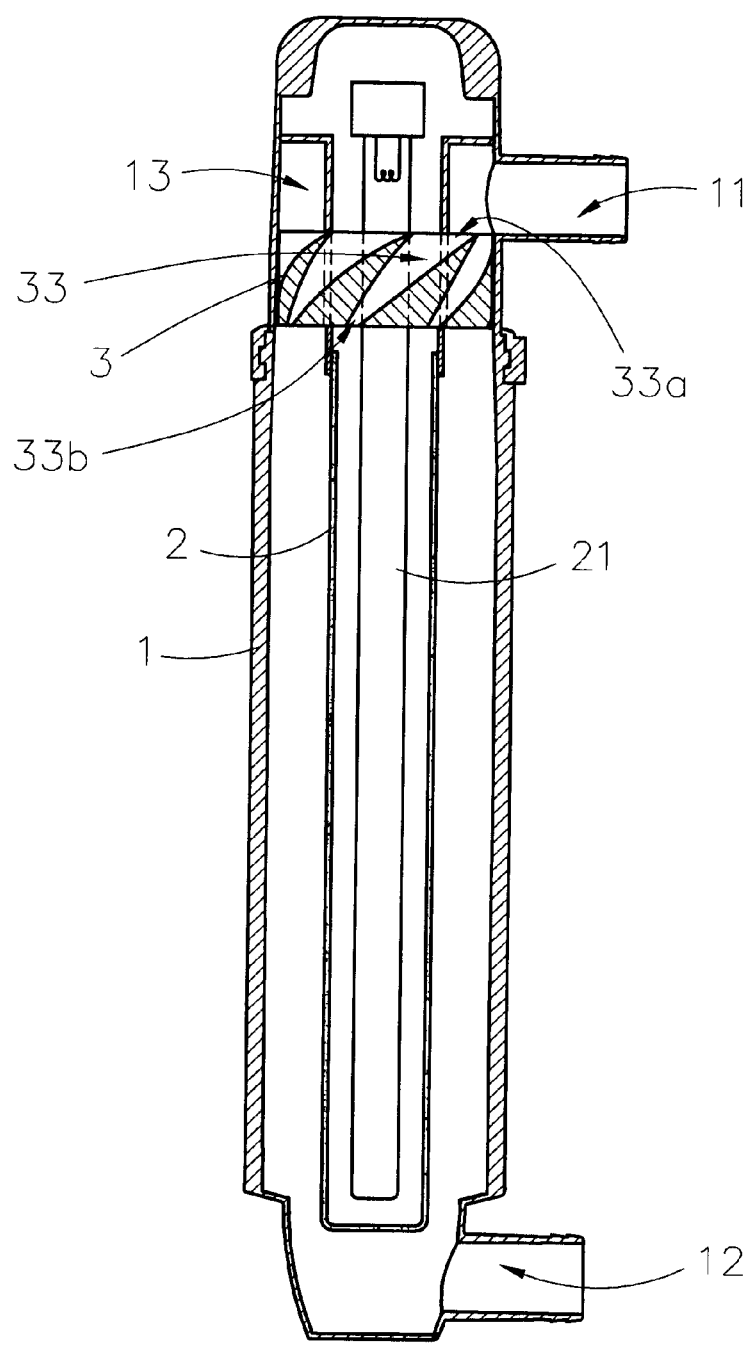
FIG. 2 is a cross-sectional view of the invention when assembled.
Figure 3:
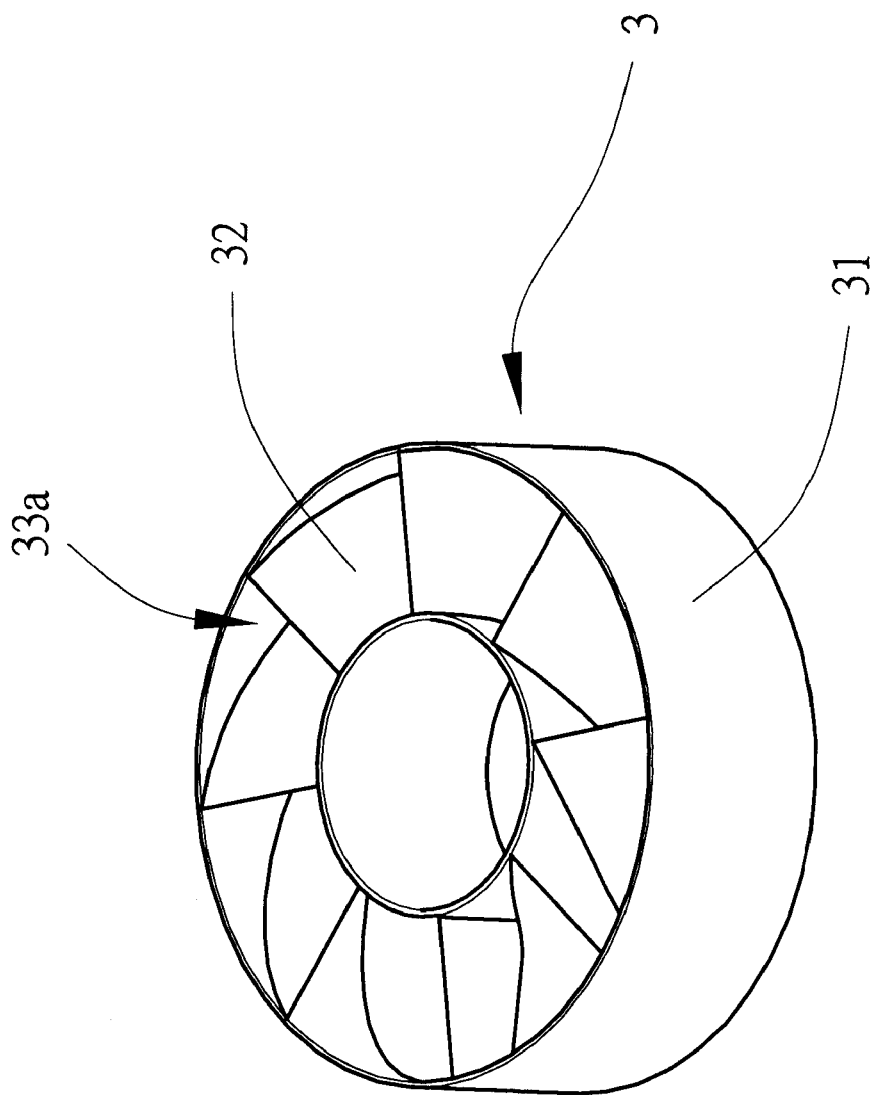
FIG. 3 is a perspective top view of the diversion mechanism in the invention.
Figure 4:
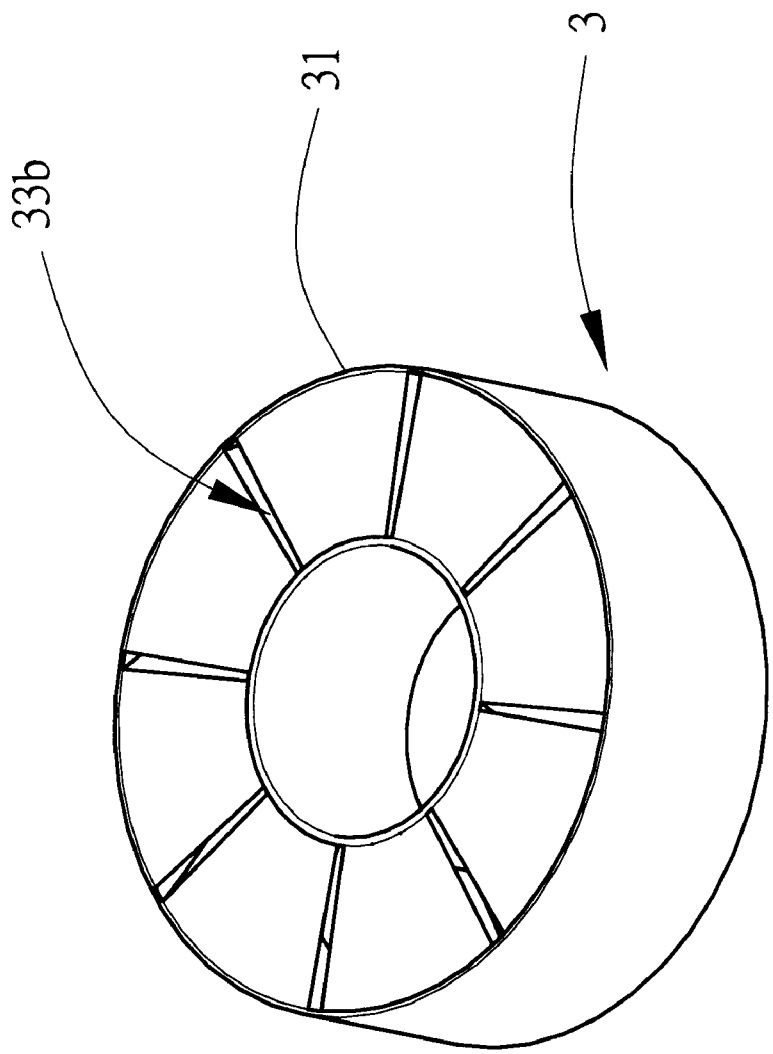
FIG. 4 is a perspective bottom view of the diversion mechanism.

As shown in FIGS. 1 and 2, the invention comprises a quartz sleeve 2 installed inside a tube unit 1, wherein is installed an ultraviolet-radiation lamp 21, and on the upper and lower ends of the tube unit 1 is a fluid inlet tube 11 and a fluid outlet tube 12; characterized in that:

Near the top of the tube unit 1 and below the fluid inlet tube 11 is installed a diversion mechanism 3, on top of the tube unit 1 is a formation of a fluid-pressurizing chamber 13, the diversion mechanism 3 has a plurality of spiral blades 32 on a ring unit 31, between two spiral blades 32 is a formation of a diversion channel 33, a fluid inlet hole 33a of the diversion channel 33 being larger than a fluid outlet hole 33b thereof. The inclination angle of the spiral blade ranging from 91 to 179 degrees serves to adjust an angle of projected fluid flow according to the different length of the tube unit. As shown in FIGS. 2 to 4, the fluid flows from the fluid inlet tube 11 into the fluid-pressurizing chamber 13, then enters the fluid inlet hole 33a from a larger opening of the diversion channel 33, and flows out of the fluid outlet hole 33b from a smaller opening below, so the fluid can form an accelerated whirlpool in the tube unit 1, and the fluid being processed can be properly blended and the living organisms in the fluid can be subjected to the radiation of ultraviolet radiation consistently for better sterilizing effects.

In the structure as described above, the fluid flows from the fluid inlet tube 11 into the fluid-pressurizing chamber 13 at the top of the tube unit 1, and from the fluid-pressurizing chamber 13 into the diversion channel 33, and since the fluid inlet hole 33a on top is larger than the fluid outlet hole 33b, so the fluid is accelerated when it flows into the pressurizing chamber. When fluid flows through the spiral blades 32 and the diversion channel 33 with a specified angle, the flow forms a high-speed whirlpool inside the tube unit 1, enabling sufficient mixing of the fluid, so the organisms in the fluid will obtain "consistent radiating time", maximum "absorption of a fatal dosage", and optimum sterilizing effects.

After the fluid flows in the fluid inlet hole 33a of the diversion mechanism and is pressurized, it flows to the fluid outlet hole 33b of the diversion channel 33, creating a whirlpool spinning at a specified angle and at a higher speed, the fluid flowing at a high speed will discourage the accumulation of dirt, so dirt will not be deposited on the surface of the quartz sleeve 2 of the ultraviolet-radiation lamp 21, thereby upgrading "ultraviolet-radiation penetration" and sterilizing effects.

The fluid flows by the spiral blades 32 of the diversion mechanism 3, creating pressurizing and turbine effects, and the construction of the diversion mechanism 3 are simplified, thereby reducing production cost and increasing its market competitiveness.

Figure 5:
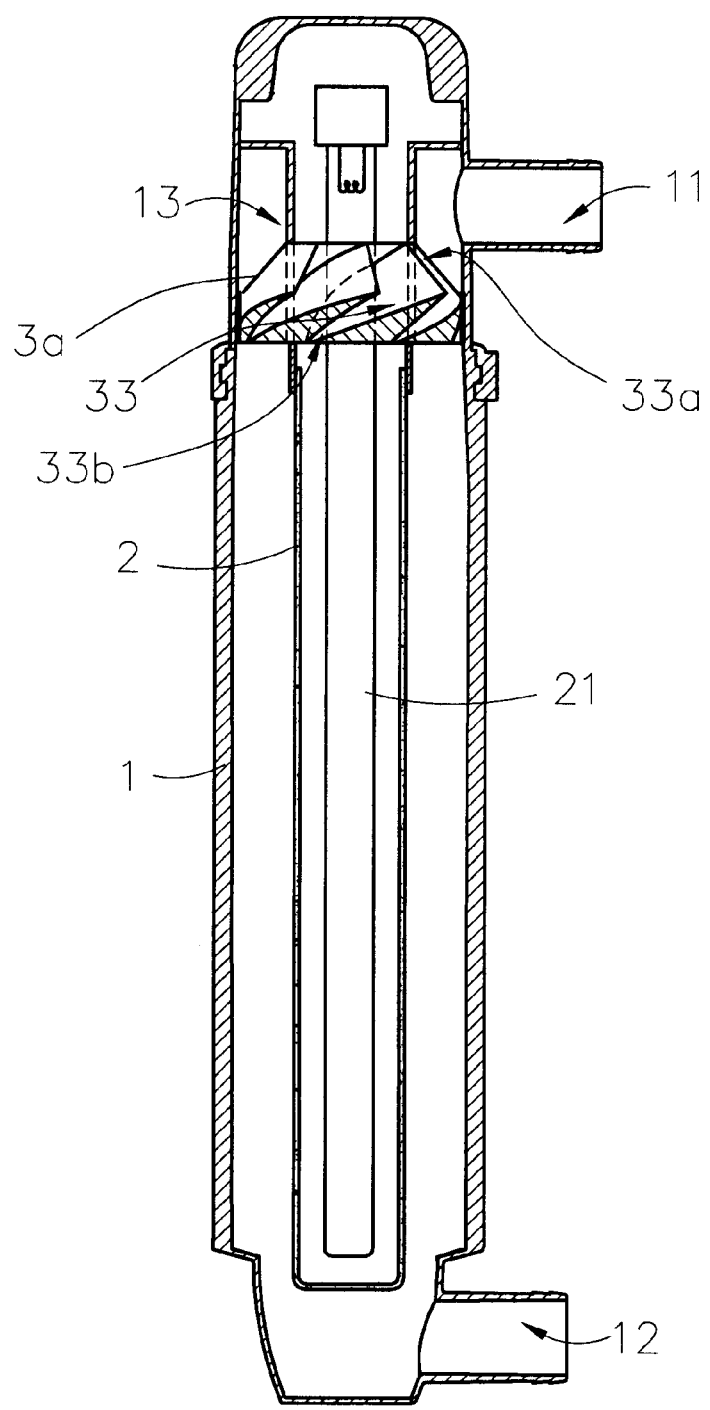
FIG. 5 is a cross-sectional view of another embodiment of the invention.
Figure 6:
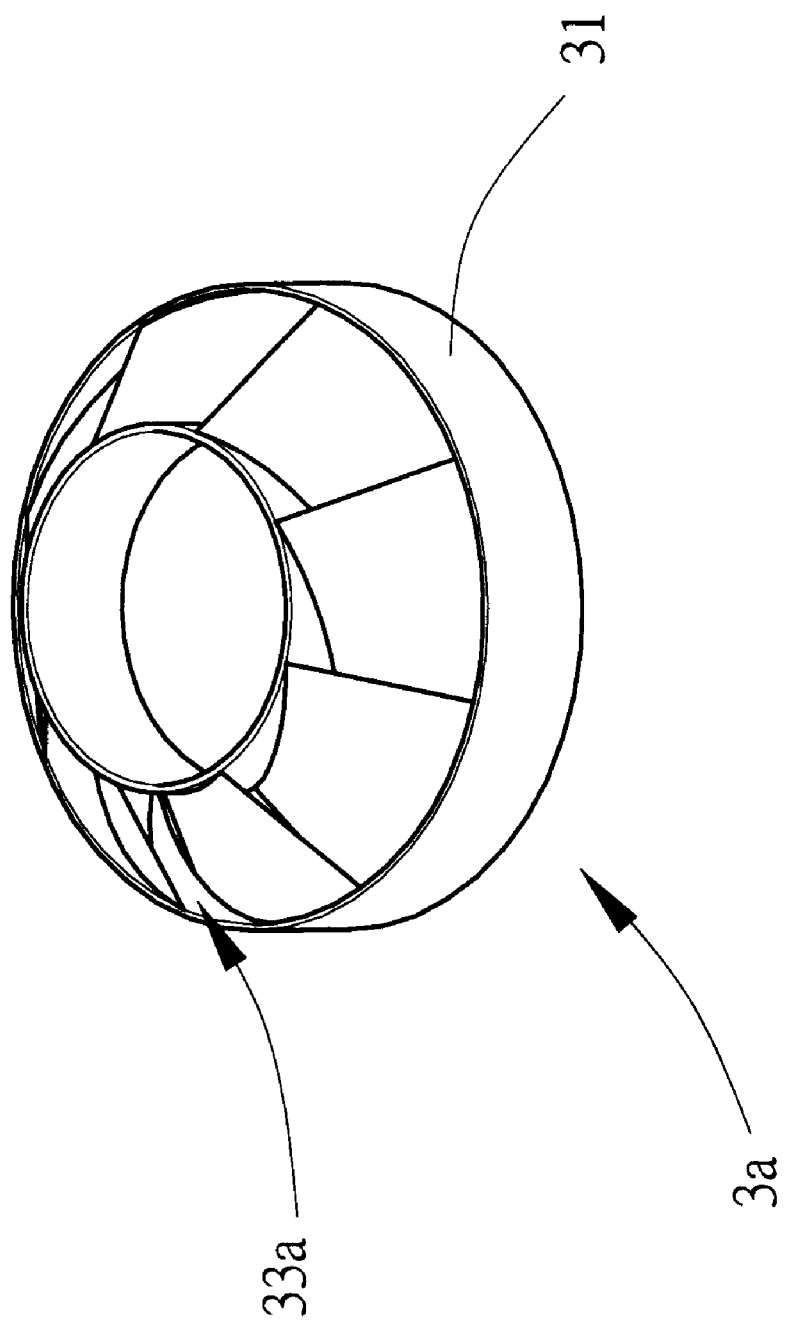
FIG. 6 is a perspective top view of the diversion mechanism in FIG. 5.
Figure 7:
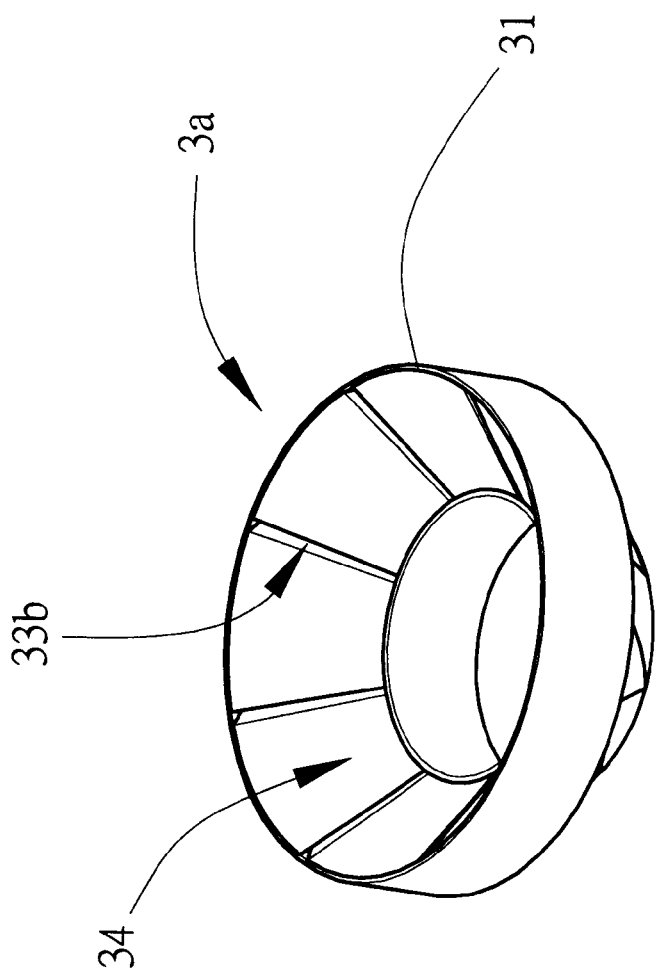
FIG. 7 is a perspective bottom view of the diversion mechanism in FIG. 5.
Figure 8:
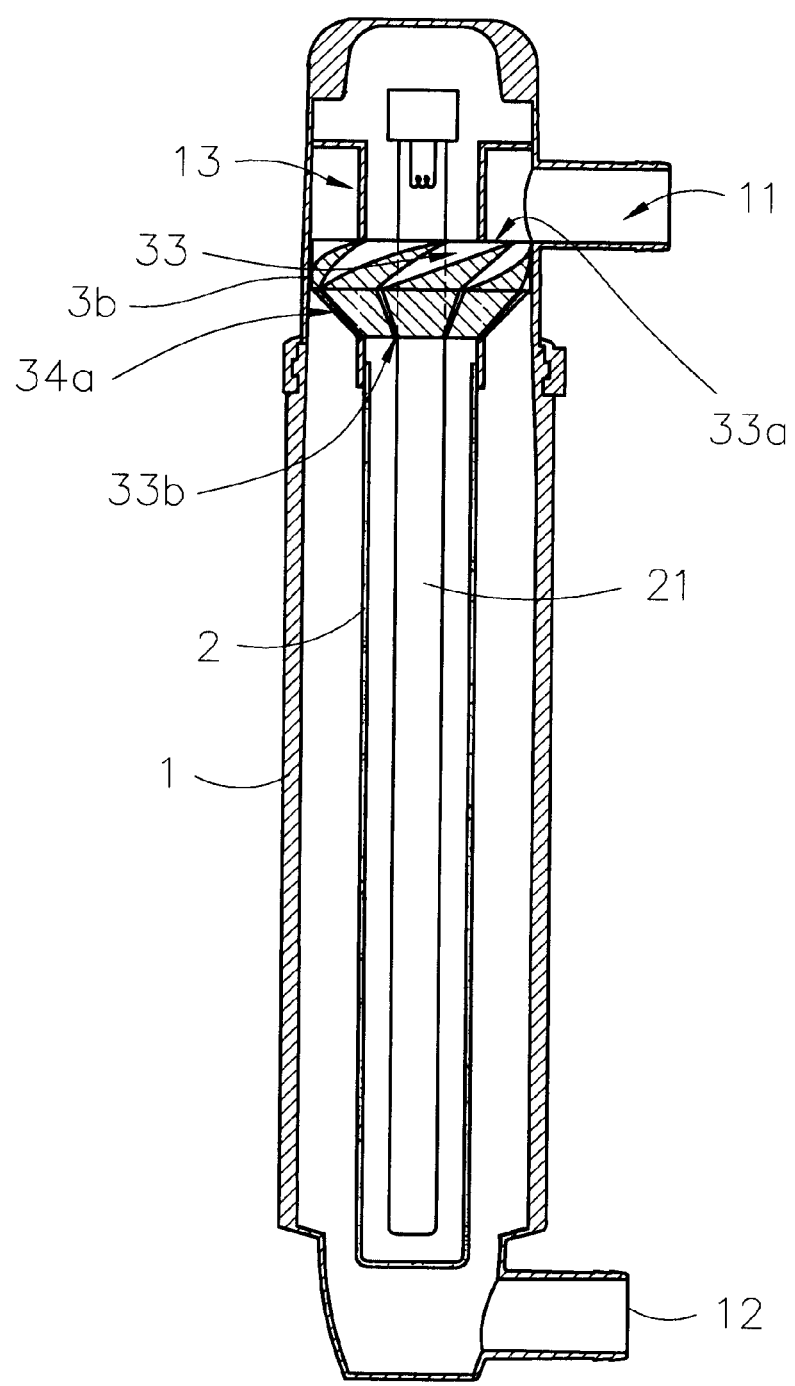
FIG. 8 is a cross-sectional view of a further embodiment of the invention.
Figure 9:
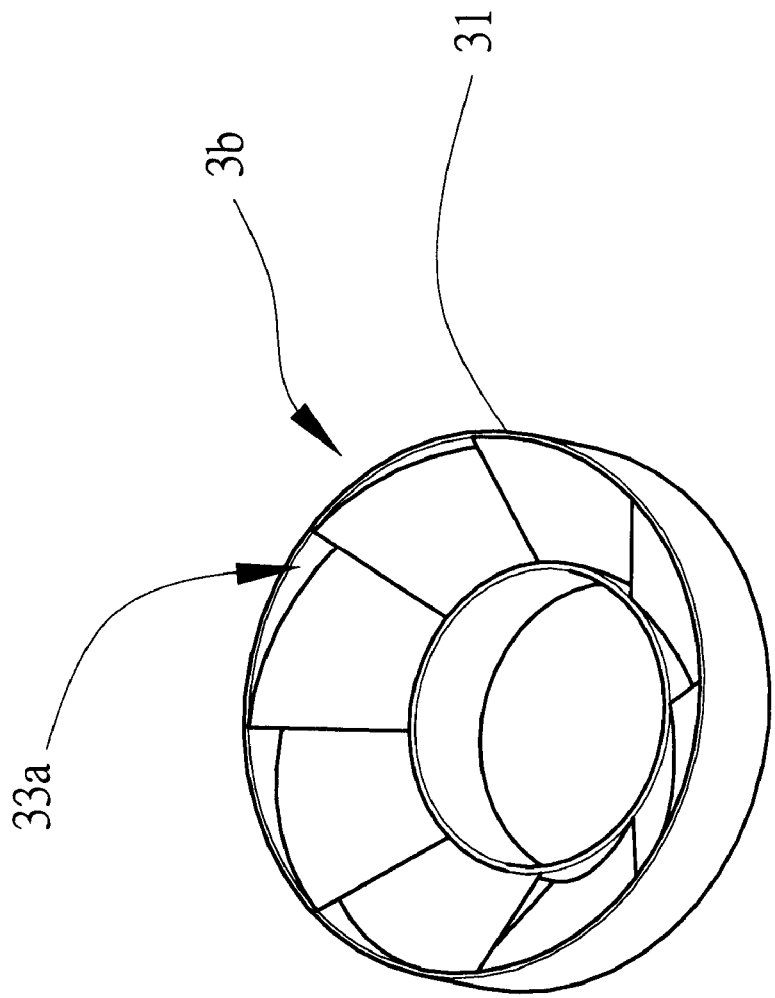
FIG. 9 is a perspective top view of the diversion mechanism in FIG. 8.
Figure 10:
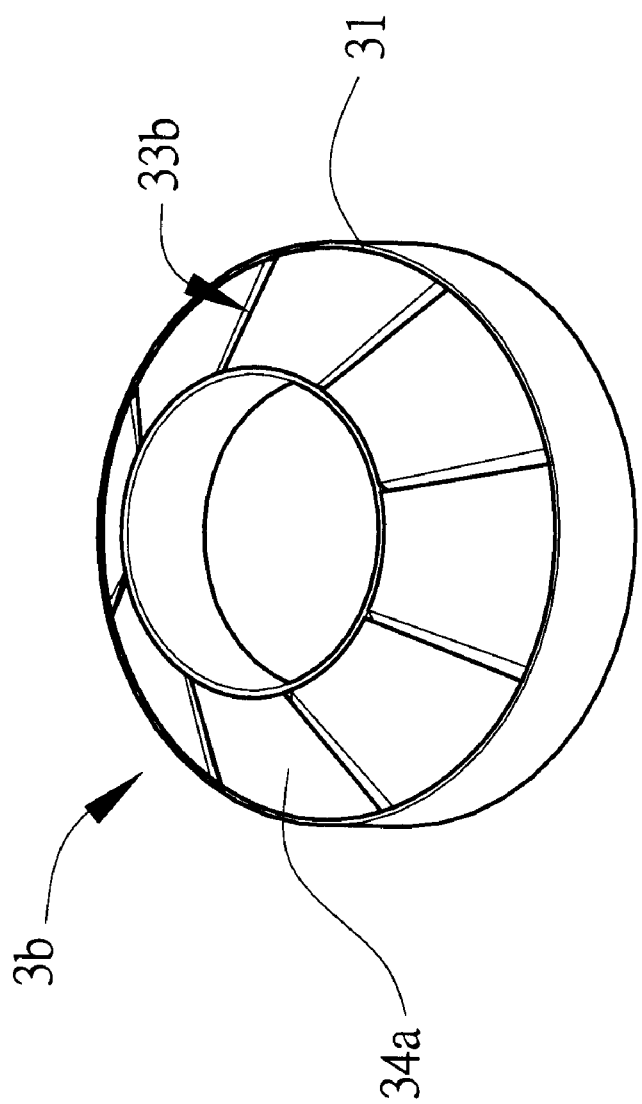
FIG. 10 is a perspective bottom view of the diversion mechanism in FIG. 8.

At a lower part of the diversion mechanism 3a is a tapered depression 34, as shown in FIGS. 5, 6 and 7, so the fluid outlet hole 33b is facing toward the inner wall of the tube unit 1; or, at a lower part of the diversion mechanism 3b is a tapered protrusion 34a, as shown in FIGS. 8, 9 and 10, so the fluid outlet hole 33b is facing toward the outer wall of the quartz sleeve 2. The fluid flows through the diversion mechanism 3, the tapered depression 34 (or the tapered protrusion 34a), spins at high speed thus flushing the wall of the quartz sleeve to avoid dirt accumulation. According to the gravity, viscosity or flow rate of the fluid as well as the length or cubic measurements of the tube unit 1 and the inclination angle of the spiral blade 32, the upward or downward inclination angle of the tapered depression 34 or tapered protrusion 34a can be adjusted from 1 to 89 degrees. The aforementioned effects can be achieved within this range.

Figure 11:
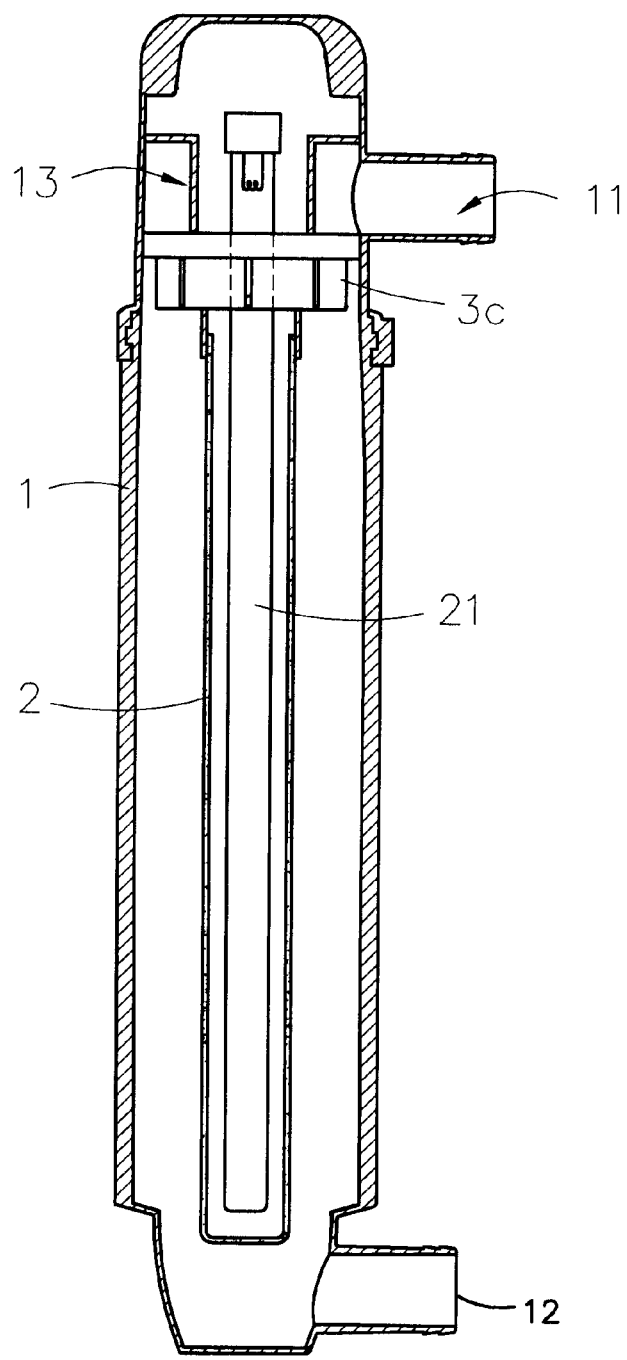
FIG. 11 is a cross-sectional view of a further embodiment of the invention.
Figure 12A:
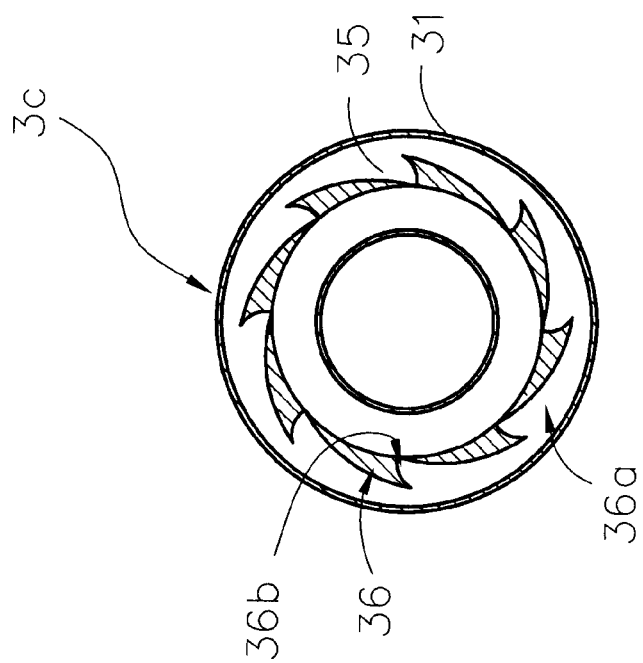
FIGS. 12A and 12B are transverse cross-sectional views of another embodiment of the diversion mechanism in the invention.
Figure 12B:
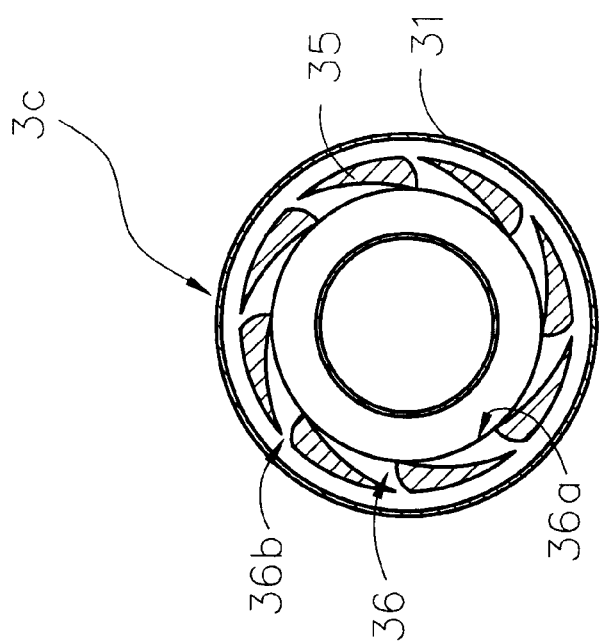
Figure 13:
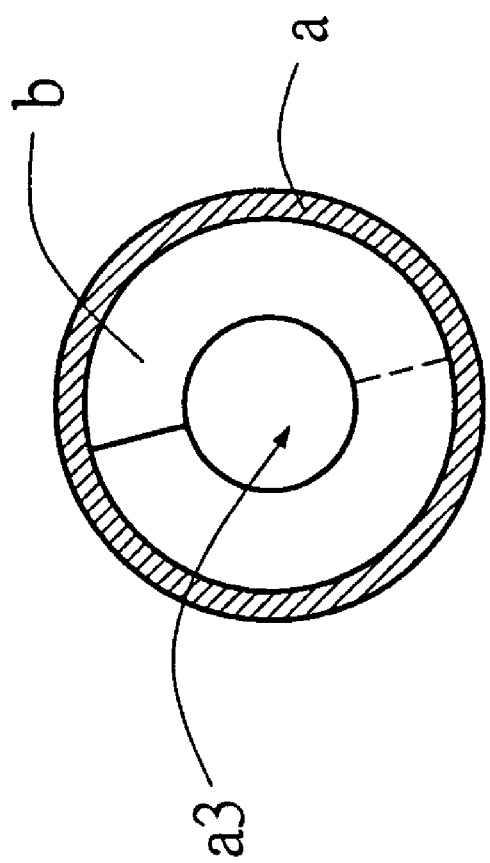
FIG. 13 is a cross-sectional view of a prior art.
Figure 14:
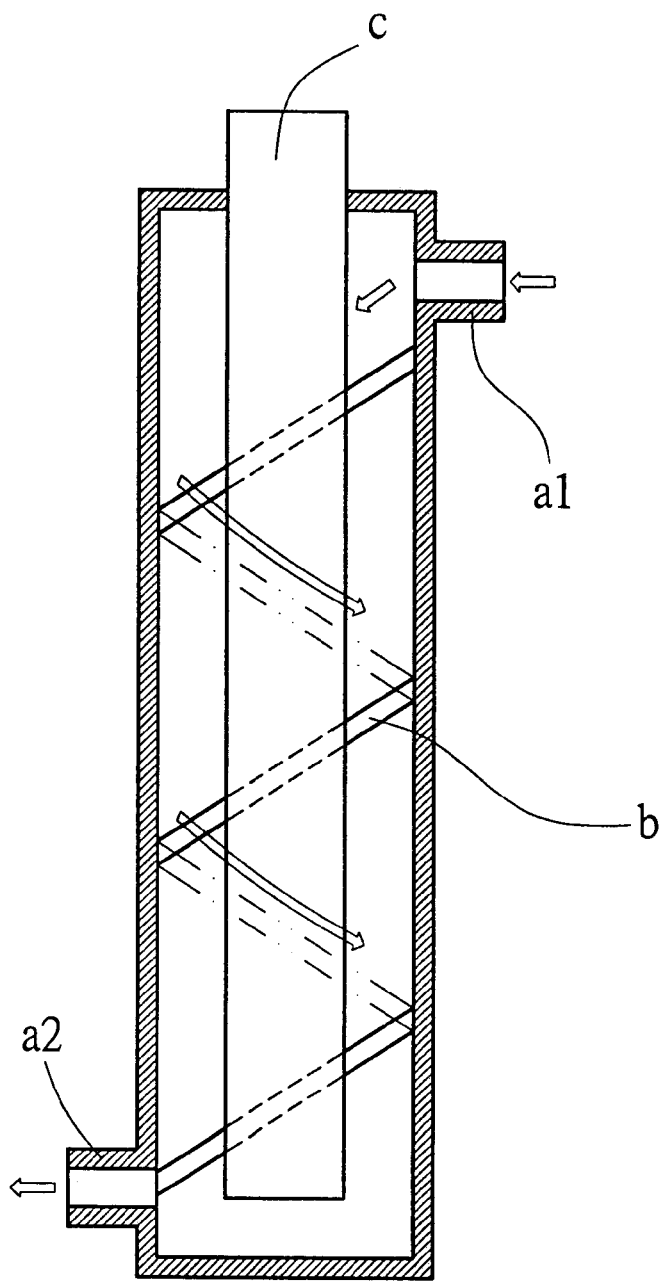
FIG. 14 is a top section view of the prior art.

Please refer to FIG. 11, the diversion mechanism 3c can be designed to suit actual requirements to have a plurality of radial blades 35 on a ring unit 31, between every two radial blades 35 is a formation of a diversion channel 36 with level flow of fluid, the fluid inlet hole 36a on the outside rim being larger than the fluid outlet hole 36b on the inside rim of the diversion channel 36 (as shown in FIG. 12A), so the fluid flows through the fluid inlet tube 11 into the pressurizing chamber 13, enters the fluid inlet hole 36a at the larger end on the outside of the diversion channel 36, and flows out of the fluid outlet hole 36b at the smaller end on the inside, enabling the fluid flow to become a rapidly spinning whirlpool inside the tube unit 1, and have the aforementioned effects, even under the circumstances of different fluid conditions, fluid flow rate, and length and cubic measurement of the tube unit 1. The diversion mechanism 3c may be designed as required to have a plurality of radial blades 35 on a ring unit 31, between each two radial blades 35 being a formation of a diversion channel 36 with a level fluid flow, the fluid inlet hole 36a on the inside rim being larger than the fluid outlet hole 36b on the outside rim of the diversion channel 36 (as shown in FIG. 12B), so the fluid can flow from inside to outside, creating a high-pressure whirlpool to achieve the above effects.

It should be noted that the above description and accompanying drawings are only used to illustrate some embodiments of the present invention and are not intended to limit the scope thereof. Any modification of the embodiments should fall within the scope of the present invention.

What is claimed is:

1. A turbine-boosted, ultraviolet-radiation sterilizing fluid processor, comprising a quartz sleeve installed inside a tube unit, an ultraviolet-radiation lamp being located inside the quartz sleeve, a fluid inlet tube and a fluid outlet tube being located at the upper end and the lower end of the tube unit respectively; characterized by:

a diversion mechanism located near the top of the tube unit and at the lower part of the fluid inlet tube, at the upper part of the tube unit and near the lower part of the fluid inlet tube being a formation of a fluid-pressurizing chamber, the diversion mechanism having a plurality of spiral blades at a ring unit, between every two spiral blades being a formation of a diversion channel inclined at a specified angle, a fluid inlet hole being larger than a fluid outlet hole of the diversion channel, enabling the fluid to flow through the fluid inlet tube into the fluid-pressurizing chamber, entering the fluid inlet hole with a larger diameter of the diversion channel being inclined at a specified angle, and flowing out of the smaller fluid outlet hole at a specified inclination.

2. The turbine-boosted, ultraviolet-radiation sterilizing fluid processor of claim 1, wherein said inclination angle of the spiral blade ranges from 91 to 179 degrees.

3. The turbine-boosted, ultraviolet-radiation sterilizing fluid processor of claim 1, wherein at a lower part of the diversion mechanism is a tapered depression, angle of upward inclination of the tapered depression ranging from 1 to 89 degrees.

4. The turbine-boosted, ultraviolet-radiation sterilizing fluid processor of claim 1, wherein at a lower part of the diversion mechanism is a tapered protrusion, angle of downward inclination of the tapered ranging from 1 to 89 degrees.

5. The turbine-boosted, ultraviolet-radiation sterilizing fluid processor of claim 1, wherein said fluid inlet hole of the diversion mechanism is located at an upper part of the diversion channel, while the fluid outlet hole is located at a lower part of the diversion channel.

6. The turbine-boosted, ultraviolet-radiation sterilizing fluid processor of claim 1, wherein said diversion mechanism is a ring unit, having a fluid inlet hole located on an outside rim of the diversion channel, and a fluid outlet hole on an inside rim of the diversion channel.

7. The turbine-boosted, ultraviolet-radiation sterilizing fluid processor of claim 1, wherein said diversion mechanism is a ring unit, having a fluid inlet hole located on an inside rim of the diversion channel, and a fluid outlet hole on an outside rim of the diversion channel.

* * * * *